United States Patent
Heim (10) Patent No.: US 8,826,292 B2
(45) Date of Patent: *Sep. 2, 2014

(54) MIGRATING VIRTUAL MACHINES BASED ON LEVEL OF RESOURCE SHARING AND EXPECTED LOAD PER RESOURCE ON CANDIDATE TARGET HOST MACHINES

(75) Inventor: Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 573 days.

This patent is subject to a terminal disclaimer.

(21) Appl. No.: 12/852,258

(22) Filed: Aug. 6, 2010

(65) Prior Publication Data

US 2012/0036515 A1   Feb. 9, 2012

(51) Int. Cl.
*G06F 9/46* (2006.01)
*G06F 9/455* (2006.01)

(52) U.S. Cl.
USPC .............................. 718/105; 718/1

(58) Field of Classification Search
CPC ............................ G06F 9/4856; G06F 9/5088
See application file for complete search history.

(56) References Cited

U.S. PATENT DOCUMENTS

| | | | |
|---|---|---|---|
| 7,203,944 B1 * | 4/2007 | van Rietschote et al. | 718/104 |
| 7,444,459 B2 | 10/2008 | Johnson | |
| 7,673,113 B2 | 3/2010 | Sugumar et al. | |
| 7,716,667 B2 * | 5/2010 | van Rietschote et al. | 718/1 |
| 7,730,486 B2 | 6/2010 | Herington | |
| 8,140,812 B2 | 3/2012 | Arroyo et al. | |
| 8,161,475 B2 | 4/2012 | Araujo et al. | |
| 8,209,687 B2 * | 6/2012 | Yuyitung et al. | 718/1 |
| 2005/0268298 A1 | 12/2005 | Hunt et al. | |
| 2006/0069761 A1 * | 3/2006 | Singh et al. | 709/222 |
| 2007/0130566 A1 * | 6/2007 | van Rietschote et al. | 718/1 |
| 2007/0169121 A1 | 7/2007 | Hunt et al. | |
| 2007/0214456 A1 | 9/2007 | Casey et al. | |
| 2007/0271560 A1 | 11/2007 | Wahlert et al. | |
| 2008/0184229 A1 | 7/2008 | Rosu et al. | |
| 2008/0295096 A1 | 11/2008 | Beaty et al. | |
| 2009/0070771 A1 * | 3/2009 | Yuyitung et al. | 718/105 |
| 2010/0005465 A1 * | 1/2010 | Kawato | 718/1 |
| 2010/0050180 A1 | 2/2010 | Amsterdam et al. | |
| 2010/0257523 A1 | 10/2010 | Frank | |
| 2010/0269109 A1 * | 10/2010 | Cartales | 718/1 |
| 2010/0332657 A1 * | 12/2010 | Elyashev et al. | 709/226 |
| 2010/0332658 A1 * | 12/2010 | Elyashev | 709/226 |
| 2011/0004735 A1 | 1/2011 | Arroyo et al. | |
| 2011/0060832 A1 * | 3/2011 | Govil et al. | 709/225 |
| 2011/0106949 A1 | 5/2011 | Patel et al. | |

(Continued)

OTHER PUBLICATIONS

USPTO, Office Action for U.S. Appl. No. 12/627,943 mailed Mar. 19, 2012.

(Continued)

*Primary Examiner* — Meng An
*Assistant Examiner* — James J Lee
(74) *Attorney, Agent, or Firm* — Lowenstein Sandler LLP (57) ABSTRACT

A mechanism for system-wide target host optimization in load balancing virtualization systems is disclosed. A method of the invention includes detecting a condition triggering a load balancing operation, identifying a plurality of candidate target host machines to receive one or more operating virtual machines (VMs) to be migrated, determining a load per resource on each identified candidate target host machine, and scheduling all operating VMs among all of the identified candidate target host machines in view of an expected load per resource on each candidate target host.

18 Claims, 4 Drawing Sheets

(56) References Cited

U.S. PATENT DOCUMENTS

| | | | |
|---|---|---|---|
| 2011/0119427 A1* | 5/2011 | Dow et al. | 711/6 |
| 2011/0119670 A1* | 5/2011 | Sugumar et al. | 718/1 |
| 2011/0131568 A1 | 6/2011 | Heim | |
| 2011/0225277 A1* | 9/2011 | Freimuth et al. | 709/223 |
| 2011/0239215 A1* | 9/2011 | Sugai | 718/1 |
| 2011/0314470 A1* | 12/2011 | Elyashev et al. | 718/1 |
| 2012/0011254 A1* | 1/2012 | Jamjoom et al. | 709/226 |

OTHER PUBLICATIONS

USPTO, Final Office Action for U.S. Appl. No. 12/627,943 mailed Oct. 15, 2012.
USPTO, Office Action for U.S. Appl. No. 12/627,950 mailed Mar. 22, 2012.
USPTO Final Office Action for U.S. Appl. No. 12/627,950 mailed Oct. 12, 2012.
USPTO, Notice of Allowance for U.S. Appl. No. 12/627,929 mailed Apr. 20, 2012.
USPTO, Corrected Notice of Allowance for U.S. Appl. No. 12/627,929 mailed Jun. 7, 2012.
USPTO, Notice of Allowance for U.S. Appl. No. 12/627,929 mailed Jul. 30, 2012.
USPTO, Office Action for U.S. Appl. No. 12/627,933 mailed Jul. 3, 2012.
USPTO, Final Office Action for U.S. Appl. No. 12/627,933 mailed Nov. 20, 2012.
Galvin, Peter Baer, "Vmware vSphere Vs. Microsfot Hyper-V: A Technical Analysis", Corporate Technologies, CTI Strategy White Paper, 2009, 32 pages.
USPTO, Advisory Action for U.S. Appl. No. 12/627,943 mailed Jan. 3, 2013.
USPTO, Office Action for U.S. Appl. No. 12/627,943 mailed Apr. 10, 2013.
USPTO, Advisory Action for U.S. Appl. No. 12/627,950 mailed Dec. 20, 2012.
USPTO, Advisory Action for U.S. Appl. No. 12/627,933 mailed Feb. 12, 2013.
USPTO, Office Action for U.S. Appl. No. 12/627,933 mailed Mar. 12, 2013.

* cited by examiner

Determine that one or more of the metrics have triggered a load balancing operation
210

Identify candidate target hosts to receive one or more VMs to be migrated
220

Determine load per resource on each identified candidate target host
230

Schedule all operating VMs on all identified candidate target host in view of the determined resource load on each host, where a target host is scheduled VMs until a targeted load per resource is achieved on the target host
240

Create a migration plan to accommodate the migration of the scheduled VMs to their candidate target hosts
250

MIGRATING VIRTUAL MACHINES BASED ON LEVEL OF RESOURCE SHARING AND EXPECTED LOAD PER RESOURCE ON CANDIDATE TARGET HOST MACHINES

RELATED APPLICATION

The present application is related to co-filed U.S. patent application Ser. No. 12/627,943 entitled "Mechanism for Target Host Optimization in a Load Balancing Host and Virtual Machine (VM) Selection Algorithm", which is assigned to the assignee of the present application.

TECHNICAL FIELD

The embodiments of the invention relate generally to virtualization systems and, more specifically, relate to system-wide target host optimization in load balancing virtualization systems.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

A virtualization system is a dynamic system. A change in load (e.g., set of resources consumed) on a host, or the balance of load on hosts in the system, can occur because VMs are scheduled to start in different points in time in the system or because VMs stop running in different points in time in the system. Even without any change in how VMs are running on each host, the load created by VMs on each host can vary in several metrics causing unbalanced load. Most commonly, the amount of CPU, memory and I/O required by each VM varies as it performs different tasks.

A load balancing algorithm may be used in such a system to try and balance the load on the different hosts in the system, usually by moving VMs from highly-utilized hosts to less-utilized hosts. This process improves the health of the system, as it prevents a disturbance in the level of service provided by hosts to the virtual machines running on them.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for system-wide target host optimization in load balancing virtualization systems. A method of embodiments of the invention includes detecting a condition triggering a load balancing operation, identifying a plurality of candidate target host machines to receive one or more operating virtual machines (VMs) to be migrated, determining a load per resource on each identified candidate target host machine, and scheduling all operating VMs among all of the identified candidate target host machines in view of an expected load per resource on each candidate target host.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for system-wide target host optimization in load balancing virtualization systems. Usually a load balancing algorithm detects that a set of criteria has been met, and then triggers a need to move a VM to another host than the one that the VM is currently operating on. For purposes of the following description, assume that a source host is a host machine that a VM is migrated from, while a target host is a host machine a VM is migrated to. Once triggered, the load balancing algorithm will select the source host to perform the migration from, and then select the VM to be migrated. A target host optimization of the load balancing algorithm takes into consideration the various candidate target hosts for migration when selecting the host to migrate from and the VM to be migrated.

The use of on-going load balancing solves any problems as identified by the trigger detection. However, in an overall resource-constrained system, there may be enough exclusion criteria applied with the load balancing algorithm (e.g., average CPU utilization being over Y percent for the last X minutes; average memory utilization being over Y percent for last X minutes; ratio between the number of virtual CPUs scheduled on host and physical cores is over Y percent) to prevent general optimized placement. As a result, embodiments of the invention provide a way to combine target host optimizations in the load balancing algorithm, while using an approach different than selecting a candidate host and then selecting a guest, to provide for optimized system-wide sharing of resources amongst host machines.

Figure 1:
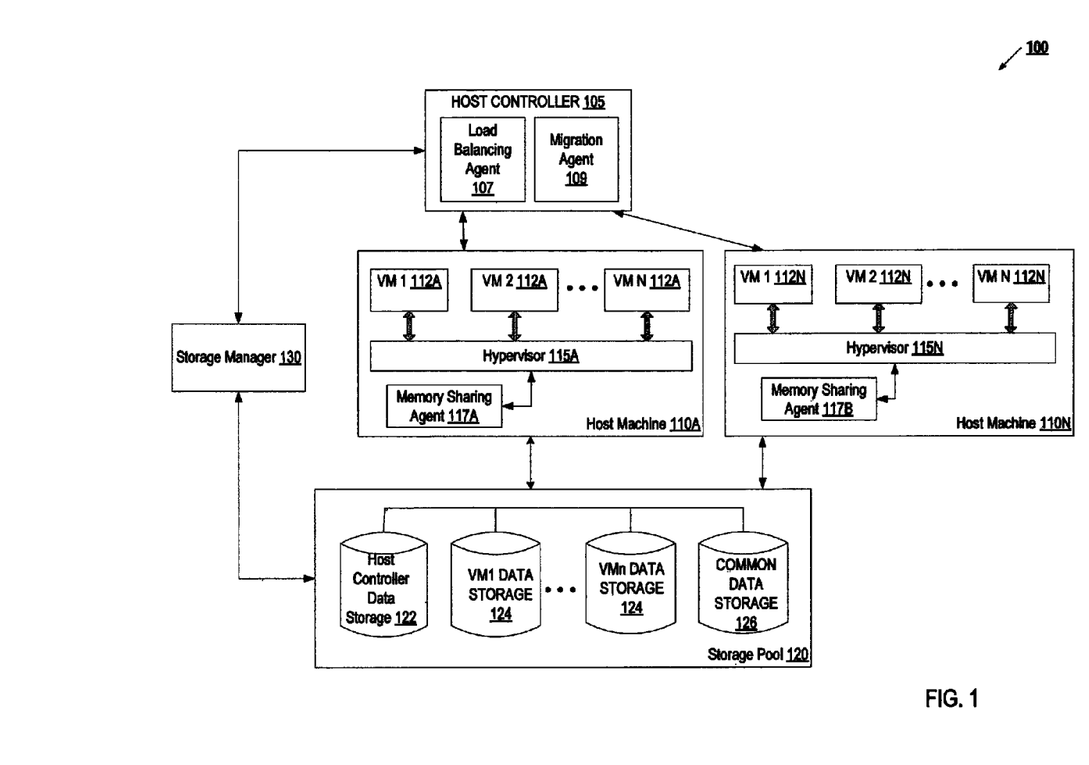
FIG. 1 is a block diagram of an exemplary virtualization architecture in which embodiments of the present invention may operate.

FIG. 1 illustrates an exemplary virtualization architecture 100 in which embodiments of the present invention may operate. The virtualization architecture 100 may include one or more host machines 110A, 110N to run one or more virtual machines (VMs) 112A, 112N. Each VM 112A, 112N runs a guest operating system (OS) that may be different from one another. The guest OS may include Microsoft Windows, Linux, Solaris, Mac OS, etc. The host 110A, 110N may include a hypervisor 115A, 1125N that emulates the underlying hardware platform for the VMs 112A, 112N. The hypervisor 115A, 115N may also be known as a virtual machine monitor (VMM), a kernel-based hypervisor or a host operating system.

In one embodiment, each VM 112A, 112N may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110A, 110N as a local client. In one scenario, the VM 112A, 112N provides a virtual desktop for the client.

As illustrated, the host 110A, 110N may be coupled to a host controller 105 (via a network or directly). In some embodiments, the host controller 105 may reside on a designated computer system (e.g., a server computer, a desktop computer, etc.) or be part of the host machine 110A, 110N or another machine. The VMs 112A, 112N can be managed by the host controller 105, which may add a VM, delete a VM, balance the load on the server cluster, provide directory service to the VMs 131, and perform other management functions.

The host 110A, 110N may also be coupled to a data storage pool 120. Data storage pool 120 may represent multiple storage devices (e.g., disks in a disk array) or a single storage device (e.g., a hard drive of the host 110A, 110N or host controller 105). In one embodiment, the storage pool 120 includes storage areas 124 designated for individual VMs 112A, 112N. When a VM 112A, 112N is created, it is associated with its own individual data storage 124, which may be an independent storage device or a designated area of a single storage device. The host 110A, 110N may further be associated with common data storage 126 of the data storage pool 120, directly or remotely. Common data storage 126 may represent an independent storage device (e.g., a disk drive) or a remote storage device (e.g., network attached storage (NAS), etc.). Data storage pool 120 may also include areas 122 designated for use by the host controller 105, which may also be an independent storage device or a designated area of a single storage device. Although shown as a single storage pool, those skilled in the art will appreciate that data storage pool 120 may be multiple, independent storage devices in dispersed locations that are logically pooled together and managed by storage manager 130.

In many cases, a VM 112A, 112N may run an OS and processes that utilize the same memory image as other VMs. In such cases, a process of the host machine 110A, 110N may be used to optimize memory utilization on the host, by referencing identical memory pages from multiple VMs to the same single memory page. This is known as memory sharing. In one embodiment, each host 110A, 110N includes a memory sharing agent 117A, 117N that operates to unify shared pages of VMs 112A, 112N running on that host 110A, 110N. In one embodiment, the memory sharing agent 117A, 117N is a Kernel SamePage Merging (KSM) feature of a Linux kernel running in host machine 110A, 110N. Instead of each VM 112A, 11N storing identical memory pages in their separate data storage 122, the memory sharing agent 117A, 117N can identify these shared pages and store one copy of these memory pages in the common data storage 124 that may be accessed by each VM 112A, 112N. Memory sharing reduces the amount of memory required in the host when running VMs with shared memory. Thus, virtualization system 100 would benefit from a load balancing algorithm optimized to consider memory as a factor.

In one embodiment, host controller 105 may include a load balancing agent 107. Load balancing agent 107 is responsible for balancing the load between different host machines 110A, 110N in virtualization system 100. A load balancing algorithm detects whether a set of criteria has been met, and if so, the algorithm triggers an operation to relocate a VM 112A, 112N to another host 110A, 110N. As part of the operation to relocate, the load balancing algorithm determines which host machines 110A, 110N and which VMs 112A, 112N will be involved in the migration process. Once the load balancing agent 107 has determined host machines 110A, 110N and VMs 112A, 112N to be load balance migrated, control is passed to a migration agent 109 to create a migration plan to enable the load balancing operation. In some embodiments, the load balancing agent 107 and the migration agent 109 may be the same component.

Embodiments of the invention provide for a system-wide target host optimization as part of the load balancing algorithm described above. In a system-wide target host optimization, the load balancing trigger event may encompass events such as a lack of balance between load factors on different target candidate hosts 110A, 110N or by an overall constraint in a resource (such as shared memory, shared templates, shared network traffic, or other such resources), that may benefit from co-locating certain VMs 112A, 112N on the same candidate target host 110A, 110N.

Instead of the typical operation of a load balancing process, where a source host 110A, 110N to perform migration from is selected and then a VM 112A, 112N to-be-migrated is selected, the load balancing algorithm for system-wide target host optimization of embodiments of the invention determines a "best overall placement." The "best overall placement" takes into consideration the overall current resource utilization ratios (and their relevant histories if available), as well as the target host optimizations criteria for all target candidate hosts 110A, 110N (e.g., shared memory, shared templates, and shared network traffic), and then forms a system-wide placement strategy that moves multiple VMs 112A, 112N around the system 100 in order to maximize resource sharing within the system 100.

The system-wide target host optimization of embodiments of the invention may utilize weighting based on the order of constraints in the system. For example, weighting be based in order of various constraints including CPU, memory, JO, network traffic, and so on. In other words, there are several considerations to take into account in a scheduling algorithm and one can give different weight to each consideration. For example, a scheduling algorithm may be as follows: X*CPU_percent+Y*network_percent−A*shared_memory−B*number_of_VMs_of_same_template. In this example scheduling algorithm if the system is constrained for memory, then A should be larger, and if the system was constrained for I/O resources, then B should be larger, and so on. A scheduling algorithm may also have many other considerations, such as power, log, etc. One skilled in the art will appreciate that a number of algorithms for system wide scheduling may be used.

One example of a system-wide target host optimized load balancing algorithm performed by the load balancing agent 107 and migration agent 109 is as follows. First, the expected load per resource on the various candidate target hosts 110A, 110N (resources may include CPU utilization, memory utilization, I/O, etc.) is calculated. Then, it is assumed that all VMs 112A, 112N currently running in the system are to be scheduled on the various candidate target hosts 110A, 110N. All VMs are then scheduled from the target host resource point of view, until the expected load per resource is achieved (with an allowed delta as specified by configuration).

To schedule the VMs, a scheduling loop is performed by the load balancing agent 107. First, one of the candidate target hosts 110A, 110N is selected. Then, VMs 112A, 112N are scheduled on that candidate target host, in descending order of level of sharing. For example, sharing may be based on target host optimizations as described above such as, shared memory, shared templates, and shared network between the VM migrating to the host and any VMs already scheduled on that host. In one embodiment, memory sharing agent 117A, 117N may be utilized to assist in determining shared memory and/or shared templates between scheduled VMs and a VM to be scheduled. When an expected resource load is surpassed, another candidate target host is selected, and the above steps are repeated with the remaining VMs 112A, 112N. This scheduling algorithm provides VM placement based on sharing considerations for the overall system.

Once all of the VMs 112A, 112N are scheduled among the candidate target hosts 110A, 110N, a migration plan is created to arrive from the current operating state to the planned state by migrating VMs from their current hosts to their planned target hosts based on the new scheduling plan. In one embodiment, the migration agent 109 creates this migration plan. In some embodiments, the migration may be throttled by number of concurrent migrations in the system. The migration may be throttled between any two hosts 110A, 110N, or per host, to reduce the load on the system during migrations.

Figure 2:
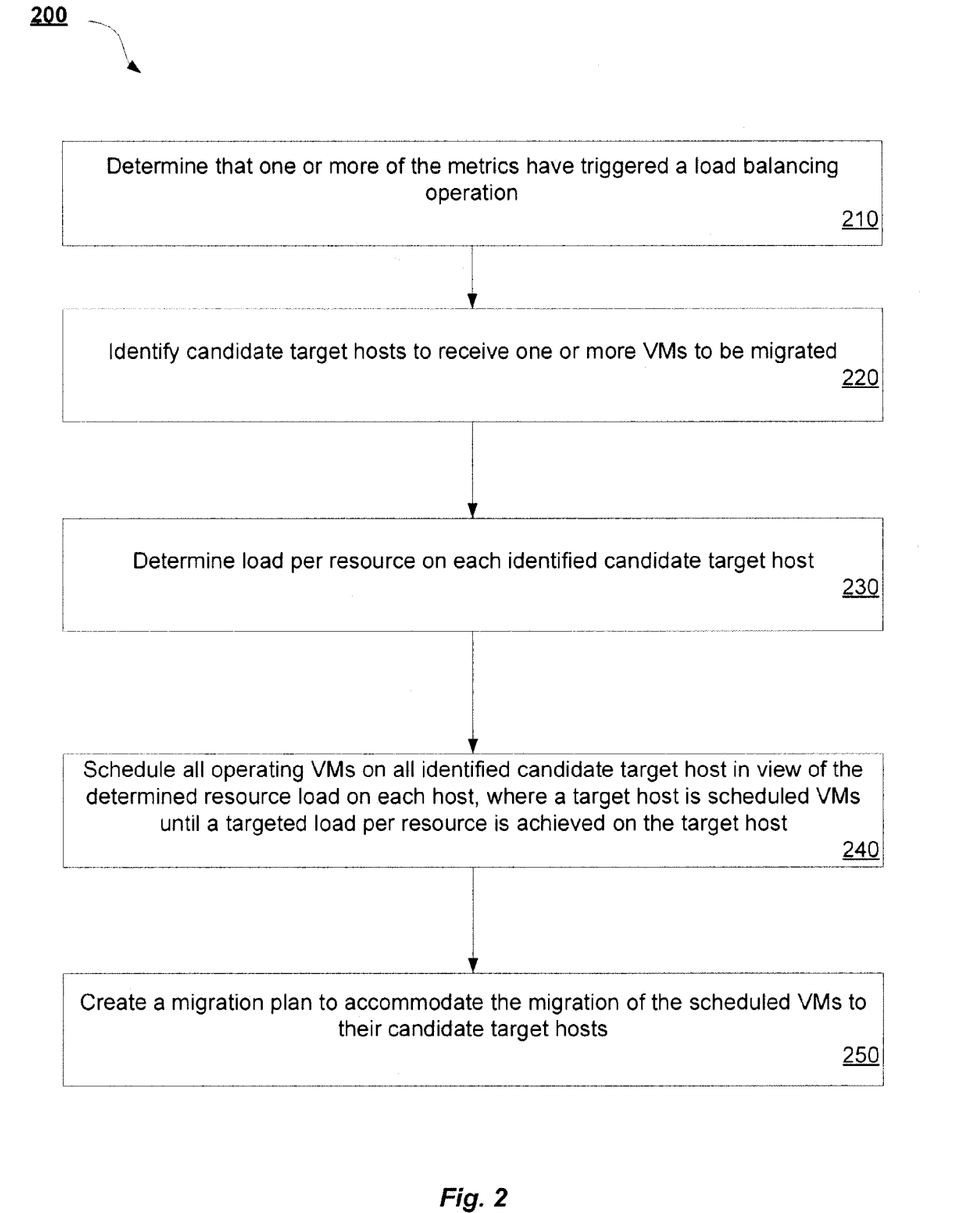
FIG. 2 is a flow diagram illustrating a method for system-wide target host optimization in load balancing virtualization systems according to an embodiment of the invention.

FIG. 2 is a flow diagram illustrating a method 200 for system-wide target host optimization in load balancing virtualization systems according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by host controller machine 105, and more specifically load balancing agent 107, of FIG. 1.

Method 200 begins at block 210 where it is determined whether one or more metrics have triggered a load balancing operation. In one embodiment, the triggering metrics may include events such as a lack of balance between load factors on different target candidate hosts or by an overall constraint in a resource (such as shared memory, shared templates, shared network traffic, or other such resources) that may benefit from co-locating VMs on the same candidate target host. Then, at block 220, all candidate target hosts operating in the system are identified.

At block 230, the expected load per resource on the various identified candidate target hosts is calculated. In one embodiment, a resource may include one or more of CPU utilization, memory utilization, I/O channels, and so on. To calculate the expected load per resource, a host machine should be loaded until a resource threshold is exhausted. For example, if memory is the resource being focused on, then for each host machine, it is calculated how many VMs are expected to be able to be loaded on the host machine by taking VMs with a good history of shared memory or from the same template for I/O considerations.

Subsequently, at block 240, all VMs are then scheduled from the target host resource point of view, until the expected load per resource is achieved. The actual load per resource achieved by the migration may fall over or under the expected load by an allowed delta, as specified by configuration settings made by an administrator. In embodiments of the invention, it is assumed that all VMs currently running in the system are eligible to be scheduled on the various identified candidate target hosts.

Lastly, at block 250, once all of the VMs are scheduled among the identified candidate target hosts, a migration plan is created. The migration plan allows for the transformation of the system from the current operating state to the planned operating state by migrating VMs from their current hosts to their planned target hosts based on the created scheduling plan. In some embodiments, the migration may be throttled by number of concurrent migrations in the system. The migration may be throttled between any two hosts, or per host, to reduce the load on the system during migrations.

Figure 3:
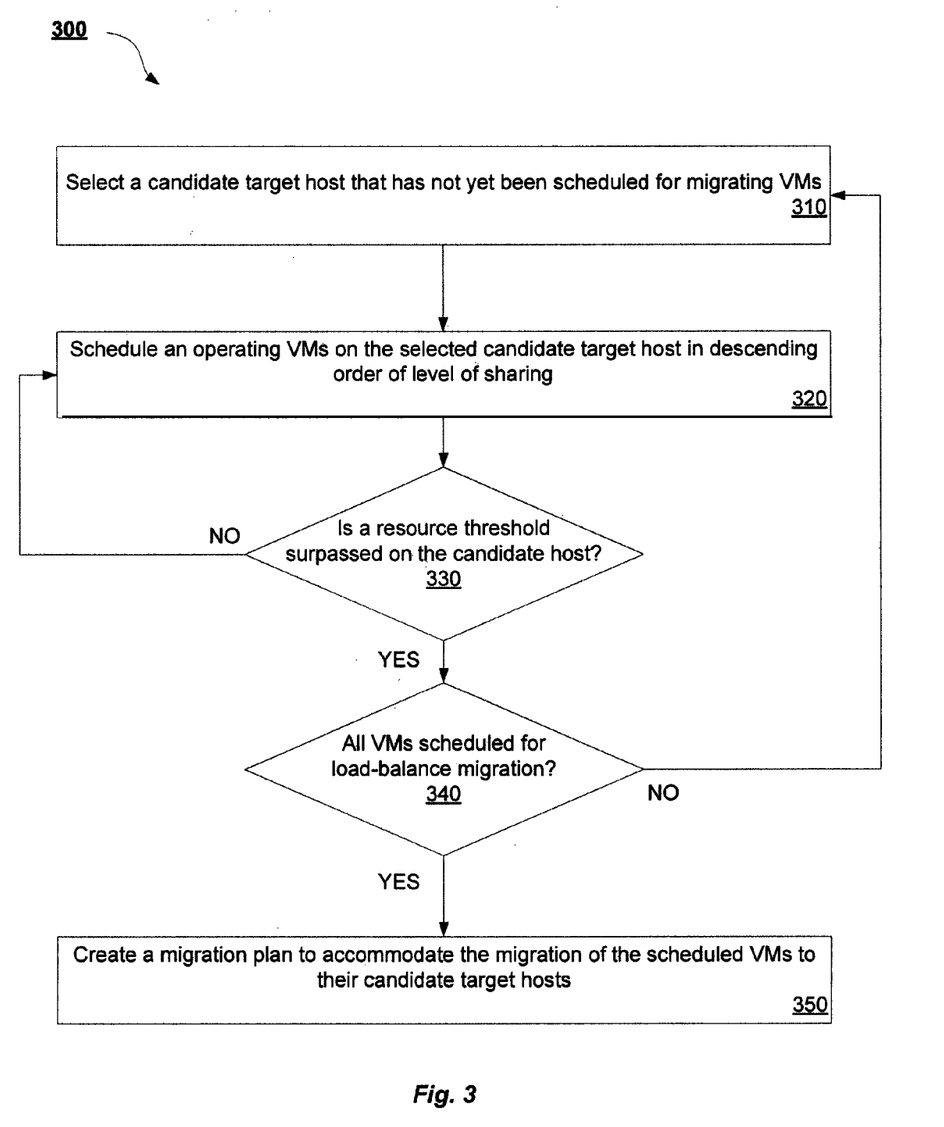
FIG. 3 is a flow diagram illustrating a method for scheduling virtual machines (VMs) in a system-wide target host optimization for load balancing virtualization systems according to an embodiment of the invention.

FIG. 3 is a flow diagram illustrating a method 300 for scheduling VMs in a system-wide target host optimization for load balancing virtualization systems according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is a detailed view of block 240 described with respect to FIG. 2. In one embodiment, method 300 is performed by host controller machine 105, and more specifically load balancing agent 107 of FIG. 1.

Method 300 begins at block 310 where a candidate target host is selected from a plurality of identified candidate target hosts operating in the system. At block 320, one or more VMs are scheduled on the selected candidate target host in descending order of level of sharing. For example, in one embodiment, the level of sharing may be based on shared memory, shared templates, and/or shared network traffic between the VMs scheduled on the candidate target host. If there are no VMs yet scheduled on that host, then any VM may scheduled on that host. Scheduling in descending order of sharing means to take the VMs with the highest amount of sharing first, then take VMs with less amount of sharing, and so on. VMs with the highest amount of sharing on the same host machine are placed first.

At decision block 330, it determined whether a resource threshold as defined by the service level agreement or the scheduling policy. For example, it may not be ideal to place more than 80% CPU usage on a host machine in order to allow some spare CPU usage for peak hours. As such, the threshold for the CPU usage resource in this case would by 80%. If the threshold on the candidate target host has not been surpassed, then method 300 continues at block 320 scheduling another VM to the selected candidate target host. On the other hand, if the expected resource load has been surpassed, then method 300 continues to decision block 340.

At decision block 340, it is determined whether all VMs have been scheduled for load-balance migration. If not, then method 300 returns to block 310 to select another candidate target host to receive VMs for scheduling. On the other hand, if all VMs have been scheduled for load-balance migration, the method 300 continues to block 350 where a migration plan is created to allow for the transformation of the system from the current operating state to the planned operating state. The migration plan will migrate all VMs from their current hosts to their planned target hosts based on the created scheduling plan. In some embodiments, the migration may be throttled by number of concurrent migrations in the system, or between any two hosts, or per host, to reduce the load on the system during migrations.

Figure 4:
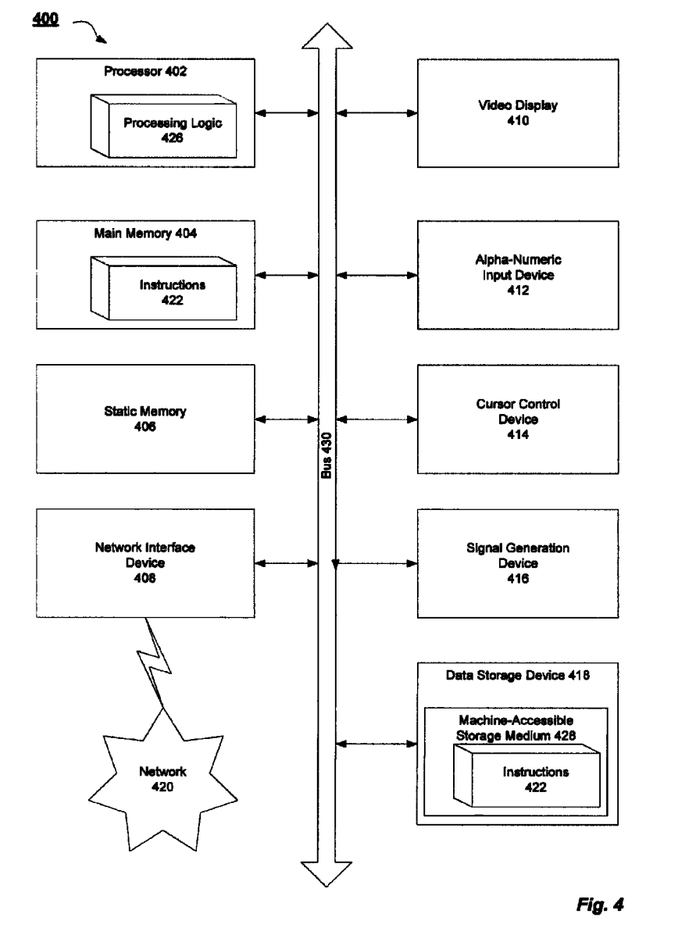
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform system-wide target host optimization in load balancing virtualization systems by host controller machine 105 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform methods 200 and 300 for system-wide target host optimization in load balancing virtualization systems described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    detecting, by a processing device, a condition triggering a load balancing operation;
    identifying, by the processing device, a plurality of candidate target host machines to receive virtual machines (VMs) migrating from a plurality of source host machines, the VMs operating on the source host machines;
    determining, by the processing device, an expected load per resource on each of the plurality of candidate target host machines by calculating how many VMs with high level of resource sharing are expected to be loaded on a candidate target host machine before a resource threshold of the candidate target host machine is reached;
    selecting, by the processing device, a target host machine among the plurality of candidate target host machines;
    scheduling, by the processing device, the VMs on the selected target host machine in a descending order of level of resource sharing with other VMs already scheduled on the selected target host machine until the resource threshold of the selected target host machine is reached, wherein the level of resource sharing is in terms of at least one of shared memory, shared templates, or shared network;
    selecting, by the processing device, another target host machine among the plurality of candidate target host machines when the expected load per resource on the selected target host machine is surpassed; and
    scheduling, by the processing device, remaining VMs on the selected another target host machine.

2. The method of claim 1, further comprising creating a migration plan to migrate each of the VMs to the candidate target host machine scheduled to receive the VM.

3. The method of claim 2, wherein the migration of the VMs is throttled by a number of concurrent migrations in a virtualization system of the VMs.

4. The method of claim 1, wherein the scheduling is in view of one or more metrics comprising an imbalance between resource load on the plurality of candidate target host machines and an overall constraint on a resource on one or more of the plurality of candidate target host machines.

5. The method of claim 1, wherein each of the candidate target host machines is scheduled VMs of the VMs until the expected load per resource on the candidate target host machine is reached.

6. The method of claim 1, wherein the scheduling the VMs further comprising selecting individual candidate target host machines to receive the scheduled VMs until all of the VMs have been scheduled.

7. A system, comprising:
    a memory;
    a processing device communicably coupled to the memory; and
    a virtual machine (VM) load balancing and migration agent executable from the memory by the processing device, the VM load balancing and migration agent to:
        detect a condition triggering a load balancing operation;
        identify a plurality of candidate target host machines to receive virtual machines (VMs) migrating from a plurality of source host machines, the VMs operating on the source host machines;
        determine an expected load per resource on each of the plurality of candidate target host machines by calculating how many VMs with high level of resource sharing are expected to be loaded on a candidate target host machine before a resource threshold of the candidate target host machine is reached;
        select a target host machine among the plurality of candidate target host machines;
        schedule the VMs on the selected target host machine in a descending order of level of resource sharing with other VMs already scheduled on the selected target host machine until the resource threshold of the selected target host machine is reached, wherein the level of resource sharing is in terms of at least one of shared memory, shared templates, or shared network;
        select another target host machine among the plurality of candidate target host machines when the expected load per resource on the selected target host machine is surpassed; and
        schedule remaining VMs on the selected another target host machine.

8. The system of claim 7, wherein the VM load balancing and migration agent further to create a migration plan to migrate each of the VMs to the candidate target host machine scheduled to receive the VM.

9. The system of claim 7, wherein the scheduling is in view of one or more metrics comprising an imbalance between resource load on the plurality of candidate target host machines and an overall constraint on a resource on one or more of the plurality of candidate target host machines.

10. The system of claim 7, wherein each of the candidate target host machines is scheduled VMs of the VMs until the expected load per resource on the candidate target host machine is reached.

11. The system of claim 7, wherein the scheduling the VMs further comprising selecting individual candidate target host machines to receive the scheduled VMs until all of the VMs have been scheduled.

12. A non-transitory machine-readable storage medium including instructions that, when accessed by a processing device, cause the processing device to perform operations comprising:
    detecting, by the processing device, a condition triggering a load balancing operation;

identifying, by the processing device, a plurality of candidate target host machines to receive virtual machines (VMs) migrating from a plurality of source host machines, the VMs operating on the source host machines;

determining, by the processing device, an expected load per resource on each of the plurality of candidate target host machines by calculating how many VMs with high level of resource sharing are expected to be loaded on a candidate target host machine before a resource threshold of the candidate target host machine is reached;

selecting, by the processing device, a target host machine among the plurality of candidate target host machines;

scheduling, by the processing device, the VMs on the selected target host machine in a descending order of level of resource sharing with other VMs already scheduled on the selected target host machine until the resource threshold of the selected target host machine is reached, wherein the level of resource sharing is in terms of at least one of shared memory, shared templates, or shared network;

selecting, by the processing device, another target host machine among the plurality of candidate target host machines when the expected load per resource on the selected target host machine is surpassed; and scheduling, by the processing device, remaining VMs on the selected another target host machine.

13. The non-transitory machine-readable storage medium of claim 12, further comprising creating a migration plan to migrate each of the VMs to the candidate target host machine scheduled to receive the VM.

14. The non-transitory machine-readable storage medium of claim 12, wherein the scheduling is in view of one or more metrics comprising an imbalance between resource load on the plurality of candidate target host machines and an overall constraint on a resource on one or more of the plurality of candidate target host machines.

15. The non-transitory machine-readable storage medium of claim 12, wherein each of the candidate target host machines is scheduled one or more of the VMs until the expected load per resource on the candidate target host machine is reached.

16. The non-transitory machine-readable storage medium of claim 12, wherein the scheduling the VMs further comprising selecting individual candidate target host machines to receive the scheduled VMs until all of the VMs have been scheduled.

17. The system of claim 8, wherein the migration of the VMs is throttled by a number of concurrent migrations in a virtualization system of the VMs.

18. The non-transitory machine-readable storage medium of claim 13, wherein the migration of the VMs is throttled by a number of concurrent migrations in a virtualization system of the VMs.

* * * * *